(12) United States Patent
Frantz et al.

(10) Patent No.: US 11,802,515 B2
(45) Date of Patent: Oct. 31, 2023

(54) AERONAUTIC PROPULSION SYSTEM WITH LOW LEAKAGE RATE AND IMPROVED PROPULSION EFFICIENCY

(71) Applicants: SAFRAN AIRCRAFT ENGINES, Paris (FR); SAFRAN TRANSMISSION SYSTEMS, Colombes (FR)

(72) Inventors: Caroline Marie Frantz, Moissy-Cramayel (FR); Gilles Alain Marie Charier, Moissy-Cramayel (FR); Maeva Daphné Gros-Borot, Moissy-Cramayel (FR); Matthieu Bruno François Foglia, Moissy-Cramayel (FR); Adrien Louis Simon, Moissy-Cramayel (FR)

(73) Assignees: SAFRAN AIRCRAFT ENGINES, Paris (FR); SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/783,073

(22) PCT Filed: Dec. 11, 2020

(86) PCT No.: PCT/FR2020/052392
§ 371 (c)(1),
(2) Date: Jun. 7, 2022

(87) PCT Pub. No.: WO2021/116622
PCT Pub. Date: Jun. 17, 2021

(65) Prior Publication Data
US 2023/0019277 A1 Jan. 19, 2023

(30) Foreign Application Priority Data
Dec. 11, 2019 (FR) ...................................... 1914193

(51) Int. Cl.
*F01D 25/18* (2006.01)
*F02C 7/36* (2006.01)
*F02K 3/04* (2006.01)

(52) U.S. Cl.
CPC .................. *F02C 7/36* (2013.01); *F02K 3/04* (2013.01); *F05D 2260/40311* (2013.01)

(58) Field of Classification Search
CPC ............. F01D 25/18; F02K 3/04; F02K 3/06; F02C 7/06; F02C 7/36; F05D 2220/325;
(Continued)

(56) References Cited

U.S. PATENT DOCUMENTS 4,251,987 A * 2/1981 Adamson ................ F02C 3/113
60/226.1
10,669,948 B2 * 6/2020 Sheridan ................. F02C 3/107
(Continued)

FOREIGN PATENT DOCUMENTS

CA 2 950 551 A1 6/2017

OTHER PUBLICATIONS

International Search Report for PCT/FR2020/052392 dated Apr. 13, 2021.
Written Opinion dated Apr. 13, 2021 from the International Searching Authority in International Application No. PCT/FR2020/052392.
(Continued)

*Primary Examiner* — Igor Kershteyn
(74) *Attorney, Agent, or Firm* — Sughrue Mion, PLLC (57) ABSTRACT

A propulsion system includes a drive shaft, a fan, a fan shaft, and a reduction device coupling the drive and fan shafts. The reduction device includes a first reduction stage and a second reduction state, and include a sun gear, centered on an axis of rotation of the drive and fan shafts and driven in rotation by the drive shaft, a ring gear, coaxial with the sun
(Continued)

gear and that drives the fan shaft in rotation about the axis, and planet gears distributed circumferentially about the axis between the sun and ring gears, each planet gear including a first portion which is meshed with the sun gear and a second portion which is meshed with the ring gear, a diameter of the first portion being different from a diameter of the second portion, and an oil transfer bearing positioned between the fan and the reduction device.

14 Claims, 3 Drawing Sheets

(58) Field of Classification Search
CPC ........... F05D 2220/324; F05D 2220/36; F05D 2240/63; F05D 2260/40311; F05D 2260/98
See application file for complete search history.

(56) References Cited

U.S. PATENT DOCUMENTS

| | | | |
|---|---|---|---|
| 11,578,666 B2* | 2/2023 | Molesini | F02C 7/36 |
| 11,708,794 B2* | 7/2023 | Molesini | F02C 7/36 |
| | | | 415/122.1 |
| 2017/0167507 A1* | 6/2017 | Niergarth | F04D 29/323 |
| 2018/0291819 A1 | 10/2018 | Sheridan | |
| 2021/0017911 A1* | 1/2021 | Spruce | F02C 7/36 |

OTHER PUBLICATIONS

Search Report and Written Opinion dated Sep. 1, 2020 from the French Intellectual Property Office in FR Application No. 1914193.

* cited by examiner

AERONAUTIC PROPULSION SYSTEM WITH LOW LEAKAGE RATE AND IMPROVED PROPULSION EFFICIENCY

CROSS REFERENCE TO RELATED APPLICATIONS

This application is a National Stage of International Application No. PCT/FR2020/052392 filed Dec. 11, 2020, claiming priority based on French Patent Application No. 1914193 filed Dec. 11, 2019, the contents of each of which being herein incorporated by reference in their entireties.

TECHNICAL FIELD

The present disclosure relates to the field of aeronautical propulsion systems, and more precisely to double flow propulsion systems having a high, or even very high bypass ratio, and a high propulsion efficiency.

BACKGROUND

A double flow propulsion system generally comprises, from upstream to downstream in the gas flow direction, a fan, an annular primary flow space and an annular secondary flow space. The mass of air aspired by the fan is therefore divided into a primary flow, which circulates in the primary flow space, and a secondary flow, which is concentric with the primary flow and circulates in the secondary flow space. The fan (or propeller) can be ducted and housed in a fan casing or, as a variant, be unducted and of the USF type (Unducted Single Fan). The fan blades can be fixed or have variable pitch, the pitch being adjusted depending on the phases of flight by a pitch change mechanism.

The primary flow space passes through a primary spool comprising one or more compressor stages, for example a low-pressure compressor and a high-pressure compressor, and a gas exhaust nozzle. Typically, the high-pressure turbine drives the high-pressure compressor in rotation via first shaft, called the high-pressure shaft, while the low-pressure turbine drives the low-pressure turbine in rotation via a second shaft, called the low-pressure shaft. The low-pressure shaft is generally housed inside the high-pressure shaft.

In order to improve the propulsion efficiency of the propulsion system and to reduce its specific fuel consumption as well as the noise emitted by the fan, propulsion system have been proposed having a high bypass ratio, i.e. the ratio between the flow rate of the secondary fluid and the flow rate of the primary fluid. What is meant here by a high bypass ratio is a bypass ratio greater than or equal to 10, for example comprised between 10 and 80 inclusive. To achieve such bypass ratios, the fan is decoupled from the low-pressure turbine, thus allowing independently optimizing their respective speeds of rotation. Generally, the decoupling is accomplished by means of a reduction gear such as an epicyclic or planetary reduction mechanism, placed between the upstream end of the low-pressure shaft and the fan. The fan is then driven by the high-pressure shaft by means of the reduction mechanism and an additional shaft, called the fan shaft, which is fixed between the reduction mechanism and the fan disk.

This decoupling thus allows reducing the speed of rotation and the pressure ratio of the fan and increasing the power extracted by the low-pressure turbine. In fact, the overall efficiency of the aeronautical propulsion systems is conditioned, to the first order, by the propulsion efficiency, which is favorably influenced by minimization of the variation of the kinetic energy of the air when passing through the propulsion system. In a propulsion system with a high bypass ratio, the essential portion of the flow rate generating the propulsive effect consists of the secondary flow of the propulsion system, the kinetic energy of the secondary flow being affected primarily by the compression that it undergoes when crossing the fan. The propulsion efficiency and the pressure ratio of the fan are thus linked: the smaller the pressure ratio of the fan, the better its propulsion efficiency will be.

Beyond its major impact on the propulsion efficiency, the selection of the pressure ratio of the fan also influences various technological characteristics of the propulsion system, including the diameter of the fan (and by extension the external dimensions of the propulsion system and of its nacelle, mass and drag), the speed of rotation of the fan and the reduction ratio of the reduction mechanism.

However, (i) the more the reduction ratio increases and the greater its radial bulk, so that the reduction mechanism is difficult to incorporate under the primary flow field and (ii) the greater the speed of the low-pressure shaft, and the greater the speed of the low-pressure compressor, which is driven by the low-pressure shaft, the lower the mean radius of the low-pressure compressor must be to limit the peripheral speed at the tips of the low-pressure compressor blading.

These two combined constraints lead to an inlet channel for the primary flow path (usually designated by its gooseneck shape) upstream of the low-pressure compressor presenting a slope all the steeper as the bulk of the reduction mechanism is high and as the mean radius of the low-pressure compressor is low. This results in an increase of the aerodynamic losses in this channel and in a poor supply of the low-pressure compressor which are detrimental to the propulsive efficiency of the propulsion system.

Currently, the preferred reduction mechanisms are of the epicyclic reduction gear type, in which the fan is driven by the planet carrier, the ring gear being fixed to the stator of the engine. In fact, such architectures allow achieving higher reduction ratios than planetary type reduction mechanisms (driving the fan using the ring gear). However, the use of an epicyclic reduction gear involves transferring oil from the fixed reference frame of the engine to the rotating frame of the planet carrier to feed the bearings and gearing of this reduction gear. In addition, in the case of a propulsion system comprising a mechanism for changing the pitch of the fan blades, it is also necessary to transfer the supply of oil to the pitch change mechanism from a fixed frame of reference (lubrication unit) of the propulsion system to a rotating frame of reference of the fan. To this end, it is known to use an OTB (Oil Transfer Bearing, a rotating multi-passage hydraulic seal or oil transfer bearing), which comprises a portion that is fixed relative to a stator portion of the propulsion system and which is connected, via dedicated pipes, to the lubrication unit comprising an oil tank and a pump, and a rotating portion which is secured in movement with a rotor portion of the propulsion system. Typically, in the case where the reduction mechanism comprises an epicyclic reduction gear, the rotating portion of the OTB is mounted on the low-pressure shaft, and downstream of the reduction gear (relative to the gas flow direction in the propulsion system) and the oil is then transferred via pipes passing through the planet carrier of the reduction gear, which is fixed. The OTB is therefore constrained in radius by the diameter of the low-pressure shaft, which involves considerable leaks (the leakage flow rate being proportional to the radius of the OTB) and therefore a short lifetime for this component. Moreover, the OTB is inaccessible during a maintenance operation since it is downstream of the reduction gear. In the event of a failure, it is therefore necessary to dismantle the reduction gear to be able to gain access to the OTB.

SUMMARY

One aim of the present application is to propose an aeronautical propulsion system, such as a turbine engine in which the fan is ducted, with or without variable pitch of the fan blades, or an unducted propulsion system of the USF type having a high bypass ratio and improved propulsion efficiency and in which the lubrication system is simplified.

To this end an aeronautical propulsion system is proposed according to a first aspect, comprising:
- a drive shaft movable in rotation around an axis of rotation,
- a fan,
- a fan shaft configured to drive the fan in rotation around the axis of rotation,
- a reduction mechanism coupling the drive shaft and the fan shaft and comprising two reduction stages including:
  - a sun gear, centered on the axis of rotation and configured to be driven in rotation by the drive shaft,
  - a ring gear, coaxial with the sun gear and configured to drive the fan shaft in rotation around the axis of rotation, and
  - a series of planet gears distributed circumferentially around the axis of rotation between the sun gear and the ring gear, each planet gear comprising a first portion forming the first reduction stage meshed with the sun gear, and a second portion forming the second second reduction stage meshed with the ring gear, a diameter of the first portion being different from a diameter of the second portion.

Moreover, the propulsion system comprises an oil transfer bearing positioned between the fan and the reduction mechanism.

Certain preferred but non-limiting features of the propulsion system according to the first aspect are the following, taken individually or in combination:
- the series of planet gears is mounted on a planet carrier which is fixed relative to a stator portion of the propulsion system and the propulsion system further comprises an oil tank and at least one pipe, the pipe fluidly connecting the oil tank to the oil transfer bearing while passing between the planet gears.
- the oil transfer bearing comprises a rotating portion mounted on the fan shaft and a fixed portion mounted on the planet carrier.
- the oil transfer bearing is positioned radially inside relative to the fan shaft.
- the hydraulic seal is closer to the axis of rotation than the fan shaft.
- the propulsion system further comprises a mechanism for changing the pitch of the blades of the fan and a utility fluidly connecting the oil transfer bearing to the pitch change mechanism.
- the reduction mechanism has a reduction ratio greater than or equal to 4.5.
- the propulsion system is unducted and the reduction ratio is greater than or equal to 6.
- each of the first portion and the second portion of the planet gears comprise helical teeth.
- the helical teeth of the first portion of the satellites form an angle comprised between 10° and 30° with the axis of rotation, preferably comprised between 15° and 25°.
- the helical teeth of the second portion of the planet gears form an angle comprised between 10° and 30° with the axis of rotation.
- the propulsion system has a bypass ratio greater than or equal to 10 and less than or equal to 80.

The aeronautical propulsion system according to the first aspect can comprise a double flow turbine engine of which the fan is ducted, with or without variable pitch of the fan blades, or an unducted propulsion system of the USF type.

According to a second aspect, the disclosure proposes an aircraft comprising a propulsion system according to the first aspect.

DESCRIPTION OF THE FIGURES

Other features, objects and advantages of the disclosure will be revealed by the description that follows, which is purely illustrative and not limiting, and which must be read with reference to the appended drawings in which.

In all the figures, similar elements bear identical reference symbols.

DETAILED DESCRIPTION

The propulsion system 1 conventionally comprises a fan 2 and a primary body. The primary body comprises, in the gas flow direction in the propulsion system 1, an inlet channel 3 extending immediately downstream of the fan 2, a low-pressure compressor 4, a high-pressure compressor 5, a combustion chamber 6, a high-pressure turbine 7, a low-pressure turbine 9 and a gas exhaust nozzle. The high-pressure turbine 7 drives the high-pressure compressor 5 in rotation via a high-pressure shaft 8 while the low-pressure turbine 9 drives the low-pressure compressor 4 and the fan 2 by means of a low-pressure shaft 10.

The fan 2 comprises a fan disk 2 provided with fan blades 11 on its periphery which, when they are set in rotation, drive the air flow in the primary flow spaces of the propulsion system 1.

The low-pressure compressor 4 comprises at least one compression stage comprising a wheel 14 with movable blades (rotor) driven by the low-pressure shaft 10 and rotating in front of a series of fixed blades (stators, or straighteners) distributed circumferentially around the axis X. If necessary the low-pressure compressor 4 can comprise at least two compression stages.

The inlet channel 3 extends immediately downstream of the fan 2. It has an intake 18, adjacent to the root of the fan blades 11, vertically below the lip 19 separating the primary flow space from the secondary flow space, and an outlet 20 adjacent to the low-pressure compressor 4. The inlet channel 3 has the general shape of a goose-neck, so that the intake 18 is radially more distant from the axis of rotation X than the outlet 20. The inlet channel 3 comprises, in a manner known per se, and inlet guide vane or IGV comprising a row of fixed blades distributed circumferentially around the axis X.

The invention applies to any type of aeronautical double flow propulsion system 1, whether the fan 2 is ducted or unducted, with fixed pitch or variable pitch blades.

In the present application, upstream and downstream are defined relative to the normal direction of flow of the gas in the fan and through the propulsion system. Moreover, the axial direction corresponds to the direction of the axis of rotation X and a radial direction is a direction perpendicular to this axis of rotation X and passing through it. Moreover, the circumferential (or lateral) direction corresponds to a direction perpendicular to the axis of rotation X and not passing through it. Unless otherwise stated, internal (respectively, inner) and external (respectively, outer), respectively, are used with reference to a radial direction so that the internal portion or face of an element is closer to the axis of rotation X than the external portion or face of the same element.

The propulsion system 1 has a high bypass ratio. What is meant here by a high bypass ratio is a bypass ratio greater than or equal to 10, comprised for example between 10 and 31 in the case of a ducted fan 2 and between 40 and 80 in the case of an unducted fan 2. To this end, the fan 2 is decoupled from the low-pressure turbine 9 to independently optimize their respective speed of rotation by means of a reduction mechanism 12 placed between the upstream end (relative to the flow direction of the gases in the propulsion system 1) of the low-pressure shaft 10 and the fan 2. The fan 2 is then driven by the low-pressure shaft 10 via the reduction mechanism 12 and a fan shaft 13, which is attached between the reduction mechanism 12 and the fan 2 disk. The fan shaft 13 is movable in rotation around an axis of rotation X coaxial with the axis of rotation X of the low-pressure shaft 10.

To calculate the bypass ratio, the flow rate of the secondary flow and the flow rate of the primary flow are measured with the propulsion system 1 is stationary in the takeoff regime in a standard atmosphere (as defined by the International Civil Aviation Organization (ICAO) manual, Doc 7488/3, 3rd edition) and at sea level.

Hereafter, all the parameters will be measured under these conditions, namely when the propulsion system 1 is stationary in the takeoff regime in a standard atmosphere (as defined by the International Civil Aviation Organization (ICAO) manual, Doc 7488/3, 3rd edition) and at sea level.

In order to improve the propulsion efficiency of the propulsion system 1 and to simplify its lubrication system, the reduction mechanism is planetary with two states and the propulsion system 1 further comprises an oil transfer bearing 15 (OTB) positioned between the fan and the reduction mechanism.

More precisely, the reduction mechanism 12 comprises:
a sun gear 33, centered on the axis of rotation X and configured to be driven in rotation by the low-pressure shaft 10, which plays the role of a drive shaft,
a ring gear 25, coaxial with the sun gear 33 and configured to drive the fan shaft 13 in rotation around the axis of rotation X, and
a series of planet gears 28 distributed circumferentially around the axis of rotation X between the sun gear 33 and the ring gear 25, each planet gear 28 comprising a first portion 38 meshing with the sun gear 33 and a second portion 39 meshing with the ring gear 25.

The first portions 38 of the planet gears 28 extend in the same plane and form a first stage 27 of the reduction mechanism 12 while the second portions 39 of the planet gears 28 extend in the same plane, which is parallel to that of the first portions 38, and form the second stage 32 of the reduction mechanism 12.

In comparison with the engines of the prior art, the propulsion system 1 has, for a high reduction ratio, a reduction mechanism 12 with a smaller bulk. The result is that the slope of the inlet channel 3 of the primary stream upstream of the low-pressure compressor 4 is gentler, which improves the feeding of the low-pressure compressor 4 and allows reducing the radius of the separation lip 19, and therefore improving the bypass ratio. In parallel, a high reduction ratio allows reducing the speed of rotation and the compression ratio of the fan 2 and optimizing the dimensioning of the low-pressure turbine 9. The propulsion efficiency of the propulsion system 1 is therefore improved.

Figure 3:
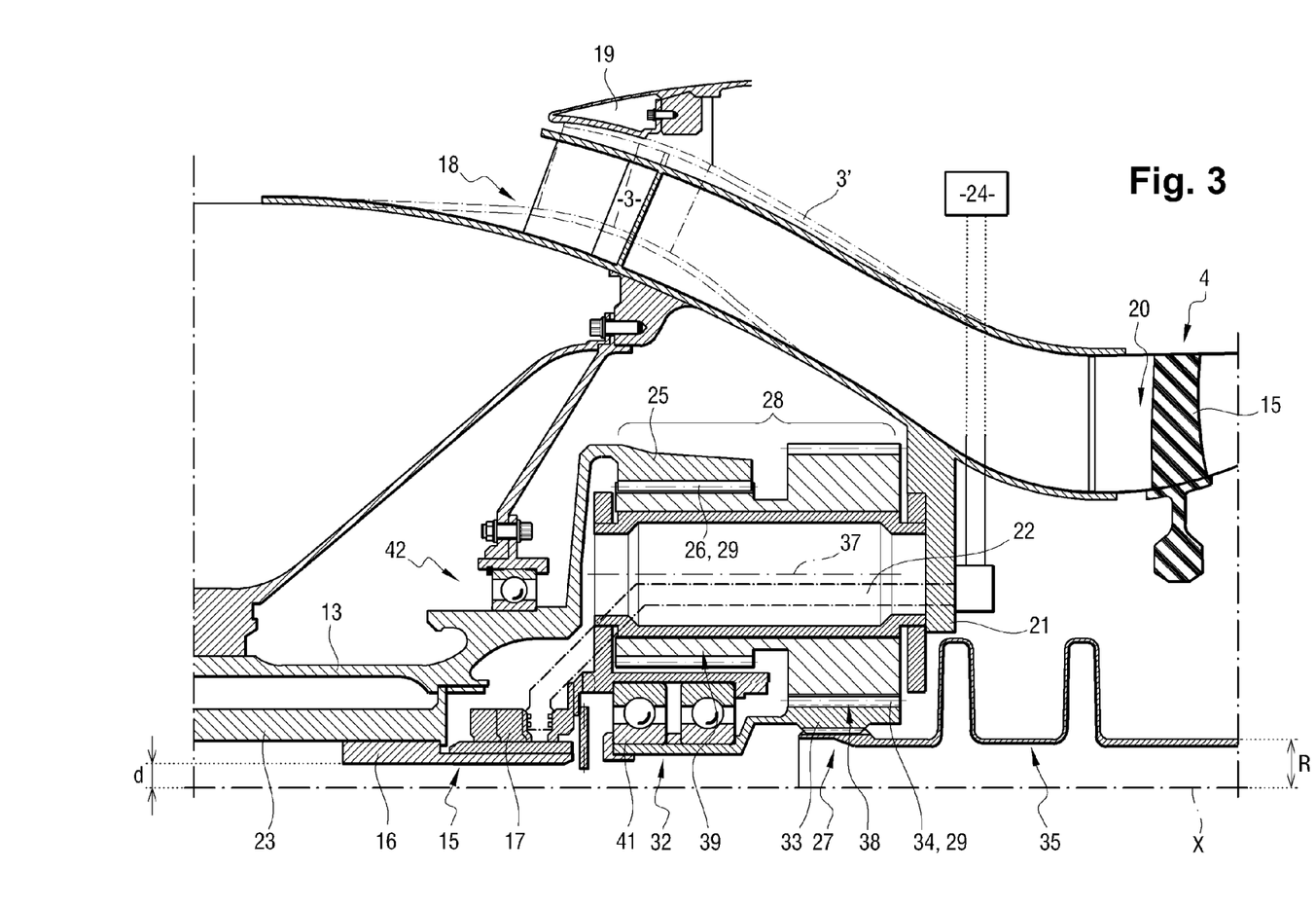
FIG. 3 is a detailed, partial and schematic section view of an example of a reduction mechanism which can be used in an aeronautical propulsion system conforming to the invention. The inlet channel of a propulsion system of the prior art has further been shown in dotted lines on this figure.
Figure 4:
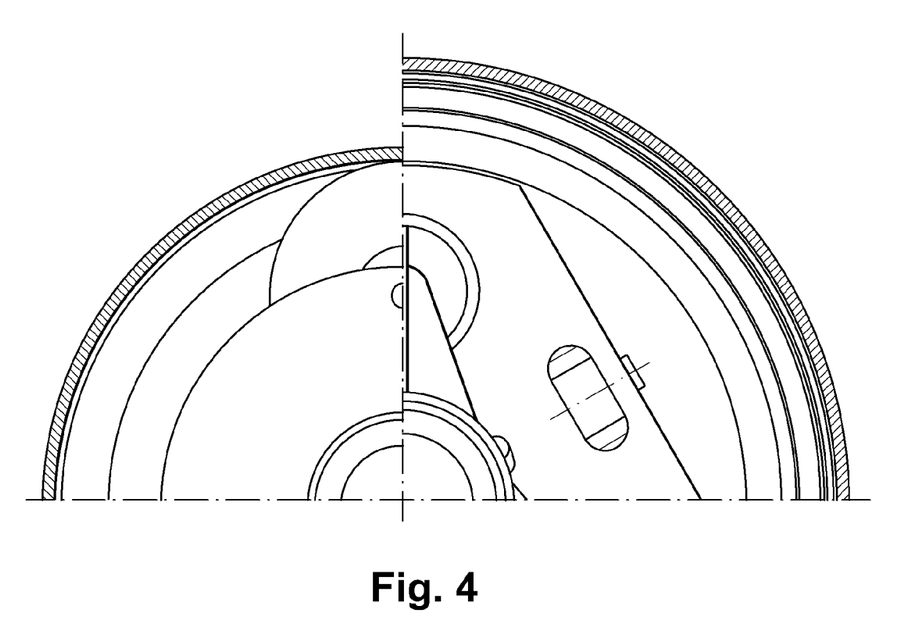
FIG. 4 is a schematic view illustrating on one side (on the left) a two-stage planetary reduction mechanism and on another side (on the right) a single-stage epicyclic reduction mechanism, for the same reduction ratio.

By way of a comparison, FIG. 4 illustrates the radial bulk obtained for a two-stage planetary reduction mechanism 12 (on the left in the figure) and a single-stage epicyclic reduction mechanism (on the right in the figure), both having the same reduction ratio. This comparison reveals that the reduction mechanism having the smaller radial bulk, for the same reduction ratio, is the two-stage planetary reduction mechanism 12. Likewise, illustrated in FIG. 3 (in dotted lines) is the shape of the inlet channel 3' when the reduction mechanism is of the single-stage epicyclic type (for the same reduction ratio). As is clearly revealed in this FIG. 3, the slope of the inlet channel 3' is definitely greater than that of the inlet channel 3 of a propulsion system 1 comprising a two-stage planetary reduction mechanism 12, which generates aerodynamic losses and reduces the propulsion efficiency of the propulsion system 1.

The reduction ratio of the two-stage planetary reduction mechanism is at least equal to 4.5.

Figure 1:
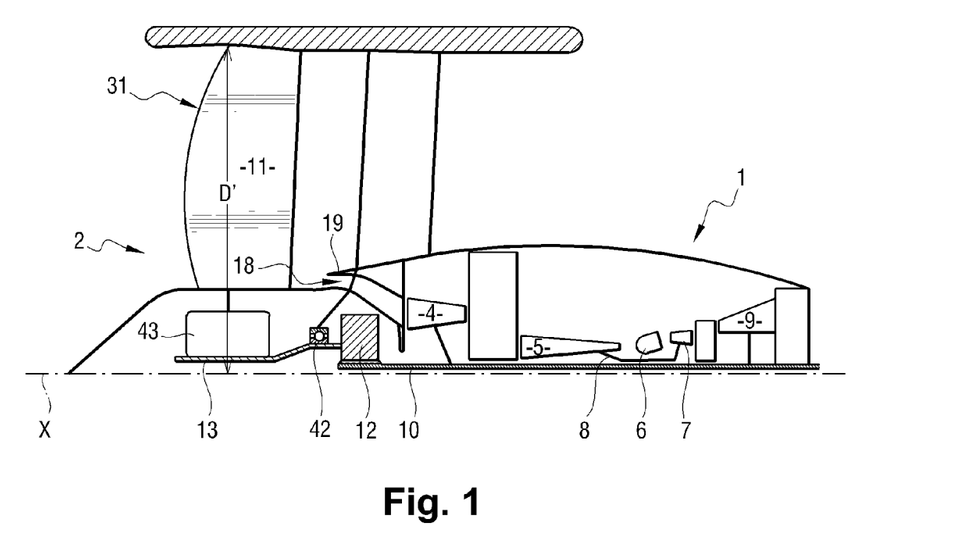
FIG. 1 illustrates schematically an example of an aeronautical propulsion system comprising a variable pitch ducted fan conforming to one embodiment of the invention.

In the case of a propulsion system 1 comprising a ducted fan 2 (FIG. 1), and possibly variable pitch fan blades 11, the reduction ratio [is] greater than or equal to 4.5, for example between 4.5 and 6.

Figure 2:
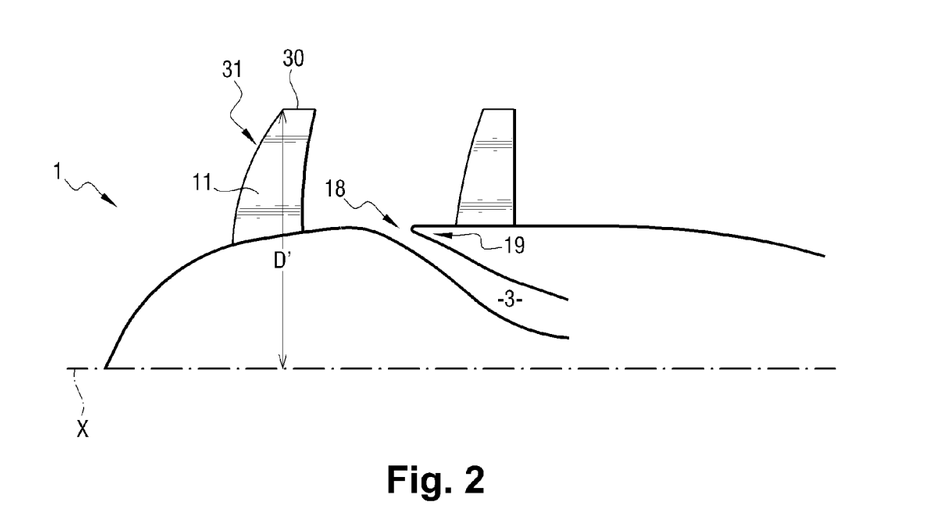
FIG. 2 illustrates schematically an example of an aeronautical propulsion system comprising an unducted fan of the USF type conforming to one embodiment of the invention.

In the case of a propulsion system 1 comprising an unducted fan 2 (FIG. 2), for example of the USF type, the reduction ratio [is] greater than or equal to 6 and less than or equal to 14, preferably less than or equal to 12, for example between 7 and 10.

Moreover, the use of a reduction mechanism 123 of the planetary type allows placing the oil transfer bearing 15 upstream of the reduction mechanism and to connect it fluidly to the oil tank 24 of the lubrication unit via pipes 22 passing between the planet gears 28. In other words, it is no longer necessary to transfer oil from the fixed frame of reference of the engine to a rotating frame of reference of the reduction mechanism 12 to feed the bearings and gearing of the reduction mechanism: it is in fact sufficient to transfer the oil directly in the pipes 22 through the planer carrier 21, which is fixed relative to a stator portion of the propulsion system 1, and to then feed the bearings a gearing 26, 29, 34 of the reduction mechanism 12 from the pipes 22. If necessary, the stator portion comprises an internal shell of the inlet channel 3.

In addition, the oil transfer bearing being placed upstream of the reduction mechanism 12, it has easier access, which simplifies maintenance operations. Moreover, the oil transfer bearing 15 can be placed closer to the axis of rotation than when it is downstream of the reduction mechanism 12, because it is no longer limited by the outer diameter of the low-pressure shaft 10. In particular, it is possible to position the oil transfer bearing 15 radially inside relative to the fan shaft 13: in other words, the oil transfer bearing 15 is closer to the axis of rotation X than the fan shaft 13. The distance d between the oil transfer bearing 15 and the axis of rotation X is therefore clearly smaller than when the oil transfer bearing 15 is placed downstream of the reduction mechanism 12, and in particular less than the radius R of the low-pressure shaft 10. The leakage flow rates, which are proportional to the distance d to the axis of rotation X, are therefore reduced, which drastically increases the lifetime of the oil transfer bearing 15.

The structure of the oil transfer bearing 15 and its feeding are therefore simplified.

In one embodiment, the oil transfer bearing 15 comprises a rotating portion 16 mounted (indirectly) on the fan shaft 13 and a fixed portion 17 mounted on the planet carrier 21.

Optionally, the propulsion system 1 further comprises a pitch change mechanism 43 configured to modify the pitch angle of the fan blades 11 depending on the phases of flight of the propulsion system. This pitch change mechanism 43 then necessitates actuation means (hydraulic cylinder) fed with oil by the oil transfer bearing 15. The propulsion system 1 therefore further comprises oil supply ancillaries 23 extending between the rotating portion 16 of the oil transfer bearing 15 and the pitch change mechanism 43. These ancillaries 23 are secured in rotation to the rotating portion 16 of the oil transfer bearing 15.

Moreover, only the portion of the oil transfer bearing 15 feeding the actuation means of the pitch change mechanism 43 comprises a rotating portion, the oil transfer bearing 15 being fed via the pipes 22 passing through the planet carrier 21, which is fixed.

In one embodiment, the ring gear 25 includes first meshing means 26, each of the planet gears 28 includes second meshing means 29 and the sun gear 33 comprises third meshing means 34. These first, second and third meshing means 26, 29 comprise, in a manner known per se, straight or helical teeth separated two by two by a recess.

More precisely, the sun gear 33 comprises a spline on its radially inner surface configured to cooperate with a corresponding spline formed on the upstream end 35 of the low-pressure shaft 10.

The ring gear 25 is movable relative to the casing of the propulsion system 1 [and] is connected to a downstream end of the fan shaft 13 in order to drive it in rotation around the axis of rotation X.

The planet gears 28 are mounted on the planet carrier 21, which is fixed relative to the casing of the propulsion system. Typically, the planet carrier 21 can be mounted on the inner shell of the inlet channel 3. Each planet gear 28 is mounted movable in rotation on the planet carrier 21 around a respective axis of revolution 37, for example by means of smooth bearings. Moreover, each satellite 28 is axially symmetrical relative to its axis of revolution 37. The diameter of the first portion 38 is different from the diameter of the second portion 39. Each portion 38, 39 of the planet gears 28 thus forms a stage 27, 32 of the reduction mechanism 12.

More precisely, the first portion 38 of each planet gear 28 is a circular cylinder relative to its axis of revolution 37 and has a radially outer surface configured to cooperate with the radially outer surface of the sun gear 33. To this end, the radially outer surface of this first portion 38 comprises second meshing means, typically teeth 29, configured to mesh with the third meshing means 34 of the sun gear 33, typically teeth 34 extending from the outer surface of the sun gear 33.

The second portion 39 of each planet gear 28 is a circular cylinder relative to its axis of revolution 37 and has a radially outer surface configured to cooperate with the radially inner surface of the ring gear 25. For this purpose, the outer surface of this second portion 39 also comprises the second meshing means, typically teeth 29, configured to mesh with the teeth 26 of the ring gear 25.

The first portion 39 and the second portion 39 of each planet gear 28 are a single piece. For example, the first portion 38 and the second portion 39 of the same planet gear 28 can be formed integrally in a single piece (monolithic). As a variant, the first portion 38 and the second portion 39 of the same planet gear 28 can be assembled.

Moreover, the planet gears 28 of the same reduction mechanism 12 are identical in shape and in dimension.

Rotation of the sun gear 33 by the low-pressure shaft 10 therefore has the effect of driving the planet gears 33 around their axis of revolution 37, which is fixed (the planet carrier 21 being fixed to the shell of the intake casing 3). The second portion 39 of the planet gears 28 being meshed with the ring gear 25, which is movable, their rotation around their axis of revolution 37 has the effect of rotating the ring gear 25 around the axis of revolution X. Finally, the fan shaft 13 being connected to the ring gear 25, the rotation of the ring gear 25 around the axis of rotation X has the effect of driving the fan shaft 13 in rotation around this axis of rotation X.

The second portion 39 of the planet gears 28 has a different diameter from their first portion 38. In order to obtain a high propulsion efficiency, the diameter of the second portion 39 is strictly less than the diameter of the first portion 38. It is in fact the difference in diameters between the first portion 38 and the second portion 39 of the planet gears 28 which allows obtaining higher reduction ratios than in a single-stage reduction mechanism 12, for a comparable radial bulk. The result is that the diameter of the first portion 38 and the diameter of the second portion 39 of the planet gears 28 can thus be dimensioned so as to achieve a reduction ratio greater than or equal to 4.5 with a low radial bulk, thus allowing reducing the slope of the inlet channel 3.

Moreover, in the case of a propulsion system 1 comprising a ducted fan 2, the diameter D of the fan 2 can be comprised between 105 inches (266.7 cm) and 135 inches (342.9 cm). In the case of a propulsion system 1 comprising an unducted fan 2, the diameter D of the fan 2 can be comprised between 150 inches (381 cm) and 180 inches (457.2 cm), for example on the order of 167 inches (424.18 cm). What is meant here by fan 2 diameter D is twice the distance, in a plane radial to the axis of revolution X, measured between the axis of rotation X and the tip 30 of the fan blades 11 at the intersection between the leading edge 31 and the tip 30 of the blade 11. What is meant by leading edge 31 here is the edge of the blade 11 configured to extend facing the flow of gases entering the fan 2. It corresponds to the anterior portion of an aerodynamic profile which faces the flow of air and which divides the air flow into a pressure side flow and a suction side flow. The trailing edge, for its part, corresponds to the posterior portion of the aerodynamic profile, where the pressure side and suction side flows are rejoined.

Moreover, for these fan 2 diameters D and rotation speeds, the compression ratio of the ducted fan 2 can be comprised between 1.04 and 1.29 while the pressure ratio of the unducted fan 2 can be comprised between 1.01 and 1.025. The compression ratio of the fan 2 is measured here under the same conditions as the bypass ratio, i.e. when the propulsion system 1 is stationary in the takeoff regime in a standard atmosphere (as defined by the International Civil Aviation Organization (ICAO) manual, Doc 7488/3, 3rd edition) and at sea level.

The bypass ratio of the propulsion system 1 can then be comprised between 10 and 31 in the case of a ducted fan 2 and between 40 and 80 in the case of an unducted fan 2.

The peripheral speed at the fan blade 11 tips (i.e. measured at their tips 30) in the takeoff regime as defined above is comprised between 260 m/s and 330 m/s when the fan 2 is ducted and is less than 225 m/s when the fan 2 is unducted.

In a first embodiment, the teeth 26, 29, 34 of the reduction mechanism 12 are helical.

In this embodiment, the reduction mechanism 12 then comprises an internal thrust bearing 41, typically a double ball bearing or a hydraulic thrust bearing, interposed between the sun gear 33 and the fan shaft 13 and configured to take up axial forces generated between the low-pressure shaft 10 and the first portion 38 of the planet gears 28. Moreover, the propulsion system 1 comprises a thrust bearing 42 at the fan 2, interposed between the fan shaft 13 and a stator (fixed) portion of the propulsion system 1 and configured to take up the axial forces generated between the second portion 39 of the planet gears 28 and the ring gear 25.

Optionally, the helical shape of the teeth 26, 29, 34 of the reduction mechanism 12 allows limiting the axial forces taken up by the thrust bearing 42. The selection of the helical angles of the teeth 26, 29, 34 and their orientation (sign) thus allow compensating the axial forces usually taken up by the thrust bearing 42. For example, a helical angle (relative to a plane comprising the axis of rotation X and the axis of revolution 37 of the planet gear 28) of the teeth 29 of the second portion 39 of each planet gear 28 comprised between 10° and 30° allows the meshing between the ring gear 25 and the second portion 39 of the planet gears 28 to compensate the tension forces applied by the fan 2 on the reduction mechanism 12. The size of the thrust bearing 42 at the fan 2 can therefore be reduced due to the compensation of the tension force applied by the fan 2 on the reduction mechanism 12 by the meshing of the helical teeth of the ring gear 25 and of the second portion 39 of the planet gears 28.

Moreover, a helical angle (relative to a plane comprising the axis of revolution X and the axis of revolution 37 of the planet gear 28) of the teeth 29 of the first portion 38 of each planet gear 28 comprised between 10° and 30°, preferably between 15° and 25°, allows compensating the forces at the inner thrust bearing 41 of the reduction mechanism 12 and therefore reducing the losses at this thrust bearing 41.

It will further be noted that the use of a two-stage planetary reduction mechanism 12 relaxes the dimensioning of the diameter of the splines of the low-pressure shaft 10. In fact, with the same bulk below the inlet channel 3 of the propulsion system 1, the radial bulk of the ring gear 25 of a two-stage planetary reduction mechanism 12 is reduced, which allows if necessary increasing the diameter of the splines on the upstream end 35 of the low-pressure shaft 10. By way of a comparison, in the case of a single-stage reduction mechanism, to obtain a high reduction ratio, it is necessary to reduce the diameters of the splines of the low-pressure shaft to satisfy the total radial bulk of the reduction mechanism 12 below the inlet channel 3.

In a second embodiment, the teeth 26, 29, 34 of the reduction mechanism 12 are straight. In this embodiment, the inner thrust bearing 41 is then optional.

The invention claimed is:

1. A propulsion system comprising:
   a drive shaft movable in rotation around an axis of rotation;
   a fan;
   a fan shaft configured to drive the fan in rotation about the axis of rotation;
   a reduction mechanism coupling the drive shaft and the fan shaft, wherein the reduction mechanism comprises a first reduction stage and a second reduction stage and includes:
   a sun gear, centered on the axis of rotation and configured to be driven in rotation by the drive shaft;
   a ring gear, coaxial with the sun gear and configured to drive the fan shaft in rotation about the axis of rotation; and
   planet gears distributed circumferentially about the axis of rotation between the sun gear and the ring gear, each planet gear comprising a first portion forming the first reduction stage which is meshed with the sun gear and a second portion forming the second reduction stage which is meshed with the ring gear, a diameter of the first portion being different from a diameter of the second portion; and
   an oil transfer bearing positioned between the fan and the reduction mechanism.

2. The propulsion system according to claim 1, wherein the planet gears are mounted on a planet carrier which is fixed relative to a stator portion of the propulsion system and the propulsion system further comprises an oil tank and a pipe, the pipe fluidly connecting the oil tank to the oil transfer bearing while passing between the planet gears.

3. The propulsion system according to claim 1, wherein the oil transfer bearing comprises a rotating portion mounted on the fan shaft and a fixed portion mounted on the planet carrier.

4. The propulsion system according to claim 1, wherein the oil transfer bearing is positioned radially inside relative to the fan shaft.

5. The propulsion system according to claim 1, wherein the oil transfer bearing is closer to the axis of rotation than the fan shaft.

6. The propulsion system according to claim 1, further comprising a pitch change mechanism for changing a pitch of blades of the fan and an ancillary fluidly connecting the oil transfer bearing to the pitch change mechanism.

7. The propulsion system according to claim 1, wherein the reduction mechanism has a reduction ratio greater than or equal to 4.5.

8. The propulsion system according to claim 7 comprising an unducted propulsion system, the reduction ratio being greater than or equal to 6.

9. The propulsion system according to claim 7, wherein the first portion and the second portion of the planet gears each comprise helical teeth.

10. The propulsion system according to claim 9, wherein the helical teeth of the first portion of the planet gears form an angle comprised between 10° and 30° with the axis of rotation.

11. The propulsion system according to claim 9, wherein the helical teeth of the second portion of the planet gears form an angle comprised between 10° and 30° with the axis of rotation.

12. The propulsion system according to claim 1 having a bypass ratio greater than or equal to 10 and less than or equal to 80.

13. An aircraft comprising the propulsion system according to claim 1 fixed to the aircraft.

14. The propulsion system according to claim 9, wherein the helical teeth of the first portion of the planet gears form an angle comprised between 15° and 25° with the axis of rotation.

\* \* \* \* \*